US012748314B2

(12) United States Patent
Chang et al.

(10) Patent No.: US 12,748,314 B2
(45) Date of Patent: Sep. 29, 2026

(54) BEAM SPLITTER/COMBINER AND PROJECTION APPARATUS

(71) Applicant: Coretronic Corporation, Hsin-Chu (TW)

(72) Inventors: Jui Chang, Hsin-Chu (TW); Kuan-Ta Huang, Hsin-Chu (TW); Jo-Han Hsu, Hsin-Chu (TW); Chi-Tang Hsieh, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 529 days.

(21) Appl. No.: 17/964,918

(22) Filed: Oct. 13, 2022

(65) Prior Publication Data

US 2023/0140825 A1 May 4, 2023

(30) Foreign Application Priority Data

Nov. 2, 2021 (CN) ......................... 202111286082.7
Mar. 7, 2022 (CN) ......................... 202210214752.2

(51) Int. Cl.
*G02B 27/10* (2006.01)
*G02B 27/14* (2006.01)
*G03B 21/20* (2006.01)

(52) U.S. Cl.
CPC ......... *G02B 27/1053* (2013.01); *G02B 27/14* (2013.01); *G03B 21/2013* (2013.01); *G03B 21/2066* (2013.01)

(58) Field of Classification Search
CPC ................ G02B 27/1053; G02B 27/14; G02B 27/1006; G02B 27/148; G02B 27/141; G03B 21/2013; G03B 21/2066
(Continued)

(56) References Cited

U.S. PATENT DOCUMENTS

2009/0091712 A1* 4/2009 Lee ...................... G02B 27/104 353/31
2011/0170184 A1 7/2011 Wolk
(Continued)

FOREIGN PATENT DOCUMENTS

CN 102629102 8/2012
CN 103944067 7/2014
(Continued)

OTHER PUBLICATIONS

"Notice of allowance of China Counterpart Application", issued on Apr. 29, 2026, p. 1-p. 4.

*Primary Examiner* — Magda Cruz
(74) *Attorney, Agent, or Firm* — JCIPRNET

(57) ABSTRACT

A beam splitter/combiner includes a first light-transmitting substrate, a first light transmission element, and a second light transmission element. The first light-transmitting substrate has a first optical surface facing incident light and a second optical surface opposite to the first optical surface. The first light transmission element is disposed on the first optical surface. The second light transmission element is disposed on the second optical surface. A first color beam incident on the first light-transmitting substrate is reflected by the first light transmission element and leaves the first light-transmitting substrate. A second color beam incident on the first light-transmitting substrate passes through the first light transmission element, is reflected by the second light transmission element, then passes through the first light transmission element, and leaves the first light-transmitting substrate. Paths of the first color beam and the second color beam incident on or leaving the first light-transmitting substrate coincide.

29 Claims, 10 Drawing Sheets

(58) Field of Classification Search
USPC .......................................................... 353/98
See application file for complete search history.

(56) References Cited

U.S. PATENT DOCUMENTS

| | | | | |
|---|---|---|---|---|
| 2018/0373135 | A1* | 12/2018 | Pan ..................... | G03B 21/204 |
| 2020/0348461 | A1 | 11/2020 | Meng et al. | |

FOREIGN PATENT DOCUMENTS

| | | | | | |
|---|---|---|---|---|---|
| CN | 211826864 | | | 10/2020 | |
| CN | 113050354 | | | 6/2021 | |
| JP | 2000267046 | A | * | 9/2000 | ............ G02B 27/28 |
| TW | 202111390 | | | 3/2021 | |

* cited by examiner

BEAM SPLITTER/COMBINER AND PROJECTION APPARATUS

CROSS-REFERENCE TO RELATED APPLICATION

This application claims the priority benefits of Chinese application serial no. 202111286082.7, filed on Nov. 2, 2021, and Chinese application serial no. 202210214752.2, filed on Mar. 7, 2022. The entirety of the above-mentioned patent application is hereby incorporated by reference herein and made a part of this specification.

BACKGROUND

Technical Field

The disclosure relates to an optical device and a display apparatus, in particular to a beam splitter/combiner and a projection apparatus.

Description of Related Art

Generally speaking, when making the illumination module of a projection apparatus (projector), the light sources of various colors (such as red, green, and blue) are placed on the same substrate and integrated into the same module with the lens array. The optical path is designed in such a way that the centers of different color beams coincide with each other before entering the projector module of the projection apparatus to improve color uniformity, reduce the size of the projection apparatus, and lower the manufacturing cost of the projection apparatus.

However, as the size of the illumination module gradually shrinks, the light sources become closer to each other, and the color beams tend to be incident on the side or the edge of the light-transmitting substrate during the merging process, resulting in a loss of combining efficiency. In addition, it is difficult to make a beam splitter/combiner by zoning the coating on the same light-transmitting substrate. At the same time, when the light source and the beam splitter/combiner are integrated into the illumination module, it is necessary to align the optical path to the boundary of the coated optical film, which makes it more difficult to manufacture the illumination module.

On the other hand, in the process of light source packaging, due to the uncertainty in the process, the light output angle may be deviated, for example, the blue/green image may show an asymmetry in the uniformity due to some factors when the light output from the light source, for example, the projected image shows the phenomenon of left blue and right green.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a beam splitter/combiner and a projection apparatus, capable of combining different color beams or splitting color beams, while reducing a size of a projection apparatus and the manufacturing cost of the projection apparatus.

Other purposes and advantages of the disclosure can be further understood from the technical features disclosed in the disclosure.

In order to achieve one or part or all of the above objectives or other objectives, an embodiment of the disclosure provides a beam splitter/combiner. The beam splitter/combiner includes a first light-transmitting substrate, a first light transmission element, and a second light transmission element. The first light-transmitting substrate has a first optical surface facing incident light and a second optical surface opposite to the first optical surface. The first light transmission element is disposed on the first optical surface. The second light transmission element is disposed on the second optical surface. A first color beam incident on the first light-transmitting substrate is reflected by the first light transmission element and leaves the first light-transmitting substrate. A second color beam incident on the first light-transmitting substrate passes through the first light transmission element, is reflected by the second light transmission element, then passes through the first light transmission element, and leaves the first light-transmitting substrate. Paths of the first color beam and the second color beam incident on or leaving the first light-transmitting substrate coincide.

In order to achieve one or part or all of the above objectives or other objectives, the disclosure provides a projection apparatus. The projection apparatus includes a light source module, a beam splitter/combiner, a light valve, and a projection lens. The light source module is configured to generate a first color beam and a second color beam. The beam splitter/combiner is disposed on a transmission path of the first color beam and the second color beam. The beam splitter/combiner is configured to form an illumination beam from the first color beam and the second color beam. The beam splitter/combiner includes a first light-transmitting substrate, a first light transmission element, and a second light transmission element. The first light-transmitting substrate has a first optical surface facing incident light and a second optical surface opposite to the first optical surface. The first light transmission element is disposed on the first optical surface. The second light transmission element is disposed on the second optical surface. The first color beam incident on the first light-transmitting substrate is reflected by the first light transmission element and leaves the first light-transmitting substrate, and the second color beam incident on the first light-transmitting substrate passes through the first light transmission element, is reflected by the second light transmission element, then passes through the first light transmission element and leaves the first light-transmitting substrate. Paths of the first color beam and the second color beam incident on or leaving the first light-transmitting substrate coincide. The light valve is disposed on a transmission path of the illumination beam, and the light valve is configured to convert the illumination beam into an image beam. The projection lens is disposed on a transmission path of the image beam for projecting the image beam outside the projection apparatus.

Based on the above, by changing the thickness of the first light-transmitting substrate, it is possible to control positions of emitted light of different color beams to achieve a combined light effect with center axes of beams aligned with each other. In addition, the disclosure may prevent a loss of light leakage caused by the beam incident to a side or an edge of the first light-transmitting substrate. The light transmission element on the first light-transmitting substrate of the disclosure is a complete optical film, which may effectively reduce the manufacturing cost of the beam splitter/combiner. At the same time, when the light source and the beam splitter/combiner are integrated into an illumination module, it is much easier to align light paths than the first light-transmitting substrate with zoned coating, which may reduce the difficulty of manufacturing the illumination module.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

The foregoing and other technical contents, features and effects of the disclosure will be clearly presented in the following detailed description of a preferred embodiment with reference to the drawings. The directional terms (e.g., up, down, left, right, forward or backward, etc.) referred to in the following embodiments are intended to refer only to the direction of the additional views. Accordingly, the directional terms used are for illustrative purposes and are not intended to limit the disclosure.

Figure 1:
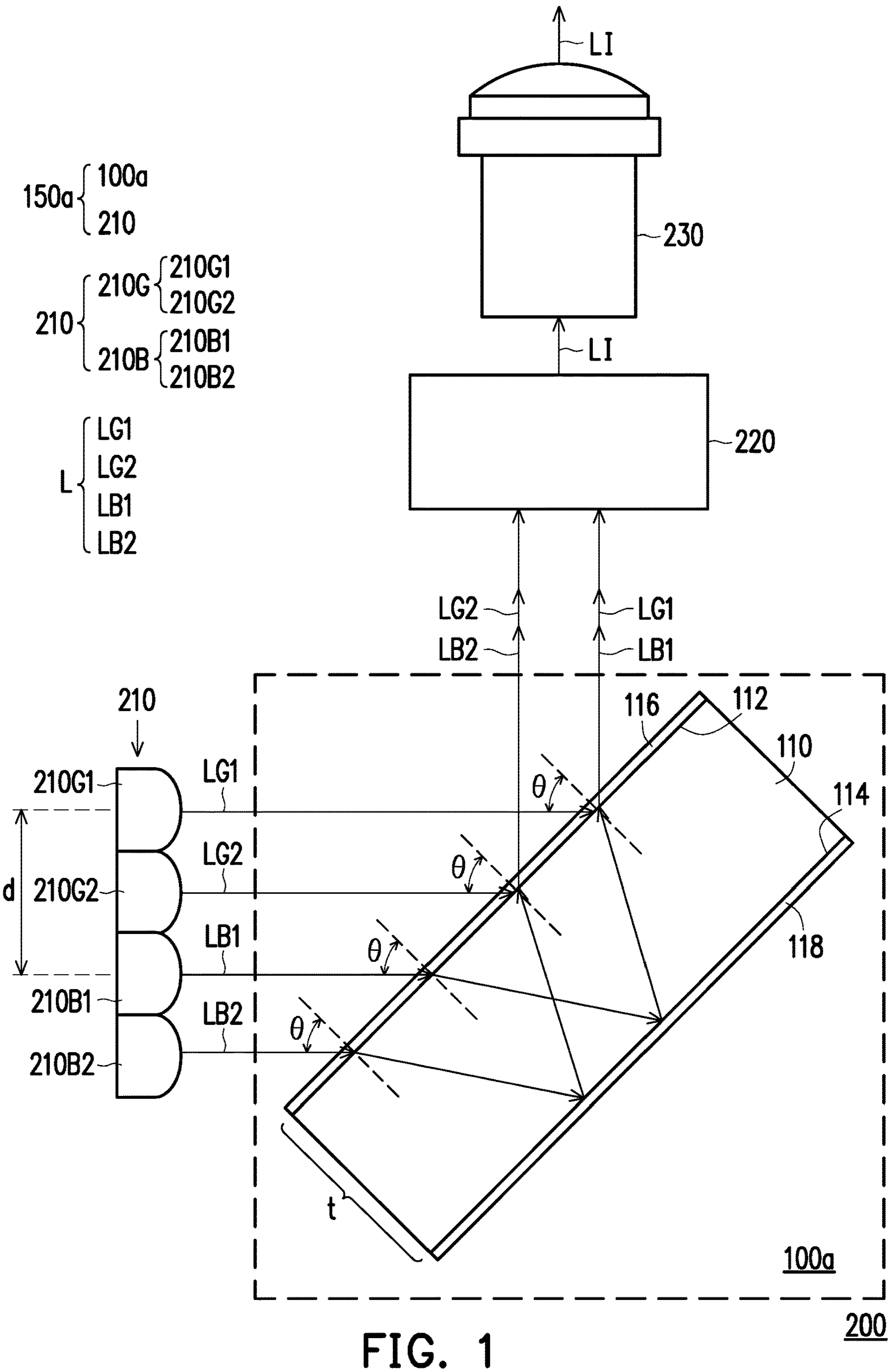
FIG. 1 is a schematic diagram of a projection apparatus according to an embodiment of the disclosure.

FIG. 1 is a schematic diagram of a projection apparatus according to an embodiment of the disclosure. A projection apparatus 200 includes an illumination module 150*a*, a light valve 220, and a projection lens 230. The illumination module 150*a* includes a beam splitter/combiner 100*a* and a light source module 210.

The light source module 210 includes a first color light source 210G and a second color light source 210B for generating a first color beam and a second color beam, respectively. The first color light source 210G includes first color light units 210G1 and 210G2 for generating first color beams LG1 and LG2, respectively. The second color light source 210B includes second color light units 210B1 and 210B2 for generating second color beams LB1 and LB2, respectively. Further, wavelengths of the first color beams LG1 and LG2 are different from wavelengths of the second color beams LB1 and LB2. According to this embodiment, the first color light source 210G is, for example, a green light source to generate a green light beam (the first color beam), and the second color light source 210B is, for example, a blue light source to generate a blue light beam (the second color beam). According to some embodiments, a number of the first color light unit of the first color light source 210G and the second color light unit of the second color light source 210B may be one or more than one, and the disclosure is not limited thereto. The light source module 210 used in this embodiment is, for example, a laser diode (LD) or a laser diode bank. Specifically, light source modules that meet the volume requirements can be implemented according to the actual design, and the disclosure is not limited thereto. As shown in FIG. 1, the first color beams LG1, LG2 and the second color beams LB1, LB2 are incident on the beam splitter/combiner 100*a* respectively. According to some embodiments, the first color beams LG1 and LG2 generated by the first color light units 210G1 and 210G2 are parallel to the second color beams LB1 and LB2 generated by the second color light units 210B1 and 210B2.

The beam splitter/combiner 100_a_ is disposed on a transmission path of incident light emitted by the light source module 210. The incident light includes the first color beams LG1, LG2 and the second color beams LB1, LB2. The beam splitter/combiner 100_a_ is configured to combine the first color beams LG1, LG2 and the second color beams LB1, LB2 to form an illumination beam L.

The beam splitter/combiner 100_a_ includes a light-transmitting substrate 110. The light-transmitting substrate 110 has a first optical surface 112 facing the incident light and a second optical surface 114 opposite to the first optical surface 112. According to some embodiments, a material of the light-transmitting substrate 110 may be glass or other light-transmitting materials, and the disclosure is not limited thereto. According to some embodiments, the first optical surface 112 and the second optical surface 114 may or may not be parallel to each other, and the disclosure is not limited thereto.

The beam splitter/combiner 100_a_ further includes a first light transmission element 116 disposed on the first optical surface 112, and a second light transmission element 118 disposed on the second optical surface 114. According to some embodiments, a material of the first light transmission element 116 and the second light transmission element 118 may be titanium dioxide ($TiO_2$) or silicon dioxide ($SiO_2$), or other suitable materials. According to some embodiments, the material of the first light transmission element 116 and the second light transmission element 118 are different. According to some embodiments, the material of the first light transmission element 116 and the second light transmission element 118 may be the same, but a thickness of the first light transmission element 116 and the second light transmission element 118 are different. The term "light transmission element" is defined as an element that provides a light transmission effect of reflecting a beam or allowing light to pass through.

Figure 10:
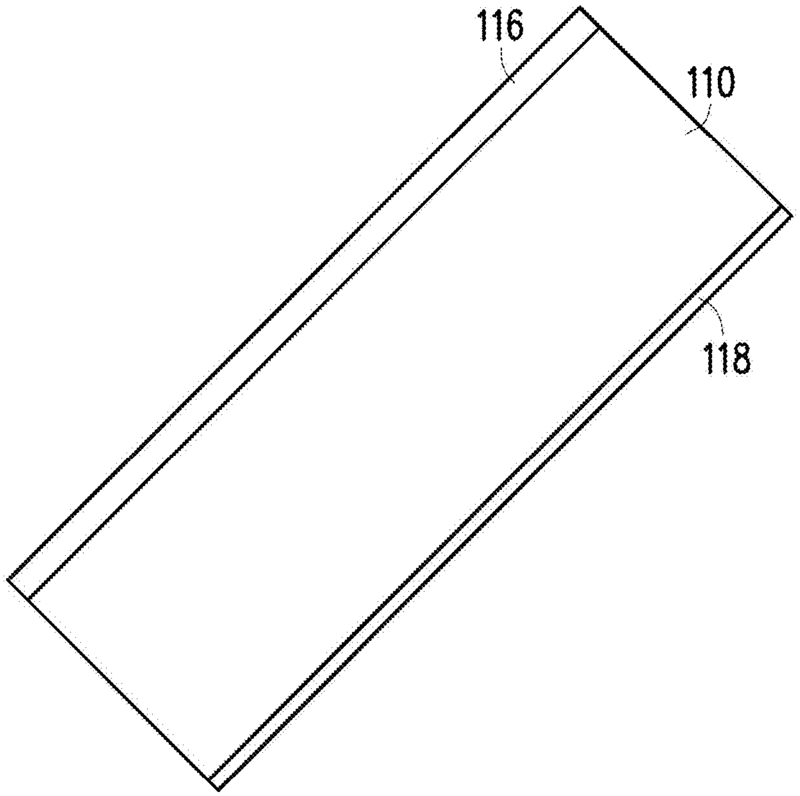
FIG. 10 is a schematic diagram of a light-transmitting substrate, a first light transmission element, and a second light transmission element according to another embodiment of the disclosure.

According to some embodiments, the first light transmission element 116 is designed to reflect green light and allow blue light to pass through, and the second light transmission element 118 is designed to reflect blue light. Further, according to other embodiments, the first light transmission element 116 may reflect the first color beams LG1 and LG2 (green light beam), the second color beams LB1 and LB2 (blue light beam) may pass through the first light transmission element 116, and the second light transmission element 118 may reflect the second color beams LB1 and LB2 (blue light beam). In addition, according to other embodiments, the first light transmission element 116 may be designed to reflect blue light and allow green light to pass through, and the second light transmission element 118 may be designed to reflect green light. Further, according to other embodiments, the first color beams LG1 and LG2 may be, for example, blue light beams, and the second color beams LB1 and LB2 may be, for example, green light beams. The first light transmission element 116 may reflect the first color beams LG1 and LG2 (blue light beams), the second color beam LB1 and LB2 (green light beams) may pass through the first light transmission element 116, and the second light transmission element 118 may reflect the second color beams LB1 and LB2 (green light beams). According to this embodiments, the first light transmission element 116 is, for example, a dielectric coating layer with a beam splitting function attached to the light-transmitting substrate 110, so that different light transmission effects (reflection or passing through) may be provided for the first color beams LG1, LG2 and the second color beams LB1, LB2 of different wavelengths, respectively, to obtain a beam splitting effect. The second light transmission element 118 is, for example, a dielectric coating layer with a beam splitting function attached to the light-transmitting substrate 110, or a reflective mirror layer formed by a metallic coating attached to the light-transmitting substrate 110 to provide a reflective effect on the second color beams LB1 and LB2. Further, when the first light transmission element 116 or the second light transmission element 118 is a dielectric coating layer, the beam splitting effect may be obtained by designing the first light transmission element 116 and the second light transmission element 118 to have different materials or thicknesses. For example, FIG. 10 is a schematic diagram of a light-transmitting substrate, a first light transmission element, and a second light transmission element according to an embodiment. The following is an example to illustrate the function of the beam splitter/combiner 100_a_ with the first color light unit 210G1 and the second color light unit 210B1.

As shown in FIG. 1, the first light transmission element 116 of the disclosure is configured to reflect the green light beams and allow the blue light beams to pass through. The second light transmission element 118 of the disclosure is configured to reflect the blue light beams.

When the first color beam LG1 emitted by the first color light unit 210G1 is incident on the beam splitter/combiner 100_a_, the first color beam LG1 is incident at an incidence angle θ on the light-transmitting substrate 110 of the beam splitter/combiner 100_a_. The first color beam LG1 is reflected by the first light transmission element 116 on the first optical surface 112 of the light-transmitting substrate 110 and leaves the light-transmitting substrate 110. The incidence angle of the first color beam LG1 onto the light-transmitting substrate 110 is defined as an angle between the first color beam LG1 and a normal line of the first optical surface 112.

On the other hand, when the second color beam LB1 emitted by the second color light unit 210B1 is incident on the beam splitter/combiner 100_a_, since the second color beam LB1 and the first color beam LG1 are parallel to each other, the second color beam LB1 is also incident at the same incidence angle θ as the first color beam LG1 on the light-transmitting substrate 110 of the beam splitter/combiner 100_a_. After the second color beam LB1 passes through the first light transmission element 116 on the first optical surface 112 of the light-transmitting substrate 110, the second color beam LB1 is reflected by the second light transmission element 118 on the second optical surface 114 of the light-transmitting substrate 110, and then passes through the first light transmission element 116 and leaves the light-transmitting substrate 110. The incidence angle of the second color beam LB1 onto the light-transmitting substrate 110 is defined as an angle between the second color beam LB1 and the normal line of the first optical surface 112.

Since an optical path is affected by a thickness and refractive index of the light-transmitting substrate 110, when the second color beam LB1 is reflected by the second light transmission element 118 on the second optical surface 114 of the light-transmitting substrate 110, passes through the first light transmission element 116 and leaves the light-transmitting substrate 110, a path of the second color beam LB1 leaving the light-transmitting substrate 110 is not always the same as a path of the first color beam LG1 leaving the light-transmitting substrate 110. In other words, when the second color beam LB1 leaves the light-transmitting substrate 110, a center axis of the second color beam LB1 and a center axis of the first color beam LG1 are not always aligned with each other. If the first color beam LG1 and the second color beam LB1 do not coincide in their paths when leaving the light-transmitting substrate 110, uniformity of color output of entire projection system is affected.

In order to make the path of the second color beam LB1 leaving the light-transmitting substrate 110 the same as the path of the first color beam LG1 leaving the light-transmitting substrate 110, that is, the center axes of the second color beam LB1 and the first color beam LG1 are aligned with each other and combined, a path of the second color beam LB1 inside the light-transmitting substrate 110 may be changed by adjusting a thickness t between the first optical surface 112 and the second optical surface 114, so that the path of the second color beam LB1 leaving the light-transmitting substrate 110 is the same as the path of the first color beam LG1 leaving the light-transmitting substrate 110.

Displacement of the path of the first color beam LG1 leaving the light-transmitting substrate 110 and the path of the second color beam LB1 leaving the light-transmitting substrate 110 is related to a distance d between the first color beam LG1 and the second color beam LB1 before they are incident on the light-transmitting substrate 110, refractive index n of the light-transmitting substrate 110, and the incidence angle θ of the first color beam LG1 and the second color beam LB1 incident on the first optical surface 112 of the light-transmitting substrate 110.

According to some embodiments, when the first optical surface 112 of the light-transmitting substrate 110 is parallel to the second optical surface 114 of the light-transmitting substrate 110, the thickness of the light-transmitting substrate 110 is t, $$t = \frac{\sqrt{n^2 - \sin^2\theta}}{\sin 2\theta} \times d.$$

In this condition, the second color beam LB1 and the first color beam LG1 leave the light-transmitting substrate 110 on the same path, that is, the center axes of the second color beam LB1 and the first color beam LG1 are aligned with each other and combined.

Similarly, when the second color beam LB2 emitted by the second color light unit 210B2 passes through the first light transmission element 116 and leaves the light-transmitting substrate 110, the path of the second color beam LB2 leaving the light-transmitting substrate 110 is the same as the first color beam LG2 emitted by the first color light unit 210G2 leaving the light-transmitting substrate 110, that is, the center axes of the second color beam LB2 and the first color beam LG2 are aligned with each other and combined. The first color beams LG1, LG2 and the second color beams LB1, LB2 form an illumination beam L leaving the beam splitter/combiner 100*a* and incident on the light valve 220.

According to some embodiments, the incidence angle θ of the first color beam LG1 and the second color beam LB1 incident on the first optical surface 112 of the light-transmitting substrate 110 (i.e., the angle between the first color beam LG1 and the second color beam LB1 and the normal line of the first optical surface 112) falls roughly in a range of 30 degrees to 75 degrees. Considering the thickness of the light-transmitting substrate and the size of the beam splitter/combiner, the incidence angle θ falls roughly in a range of 30 degrees to 60 degrees. According to some embodiments, the incidence angle θ is roughly 45 degrees.

According to some embodiments, the first color beams LG1, LG2 and the second color beams LB1, LB2 form same size light spots when incident on the beam splitter/combiner 100*a*. Geometric centers of the light spots formed by the first color beam LG1 and the second color beam LB1 leaving the light-transmitting substrate 110 coincide, and the geometric centers of the light spots formed by the first color beam LG2 and the second color beam LB2 leaving the light-transmitting substrate 110 coincide.

According to some embodiments, the illumination module 150*a* of the projection apparatus 200 further includes a third color light source, e.g., a red color light source (not shown in FIG. 1). The third color light source may be disposed at any position of the projection apparatus 200, and the third color light source is configured to emit a third color beam, e.g., a red light beam. The third color beam, the first color beams LG1, LG2 and the second color beams LB1, LB2 form the illumination beam L, incident on the light valve 220.

According to some embodiments, if emission positions of the first color beam LG1 and the second color beam LB1, the first color beam LG2 and the second color beam LB2 are changed to incident positions, the paths of the first color beam LG1 and the second color beam LB1 incident on the light-transmitting substrate 110 coincide, the paths of the first color beam LG2 and the second color beam LB2 incident on the light-transmitting substrate 110 coincide, the geometric centers of the light spots formed by the first color beam LG1 and the second color beam LB1 incident on the light-transmitting substrate 110 coincide, and the geometric centers of the light spots formed by the first color beam LG2 and the second color beam LB2 incident on the light-transmitting substrate 110 coincide. The beam splitter/combiner 100*a* may split the first color beams LG1, LG2 and the second color beams LB1, LB2 of the illumination beam L. The emission positions of the first color beams LG1, LG2 and the second color beams LB1, LB2 after being split may be controlled by changing the thickness t of the light-transmitting substrate 110.

The light valve 220 is disposed on a transmission path of the illumination beam L, and the light valve 220 is configured to convert the illumination beam L into an image beam LI. According to some embodiments, the light valve 220 is, for example, a digital micro-mirror device (DMD) or a liquid-crystal-on-silicon panel (LCOS panel). However, according to other embodiments, the light valve 220 may also be a transparent liquid crystal panel or other spatial light modulator, and the disclosure is not limited thereto.

The projection lens 230 is disposed on a transmission path of the image beam LI, and is configured to project the image beam LI outside the projection apparatus 200, such as on a screen (not shown) outside the projection apparatus 200, to form an image. The projection lens 230 includes, for example, a combination of one or more optical lenses with refractive power. The optical lens includes, for example, a non-planar lens such as a biconcave lens, a biconvex lens, a concave-convex lens, a convex-concave lens, a plano-convex lens, a plano-concave lens, etc., or various combinations thereof. According to an embodiment, the projection lens 230 may also include a flat optical lens. Here, the embodiment does not limit the form and the type of the projection lens 230.

Figure 2:
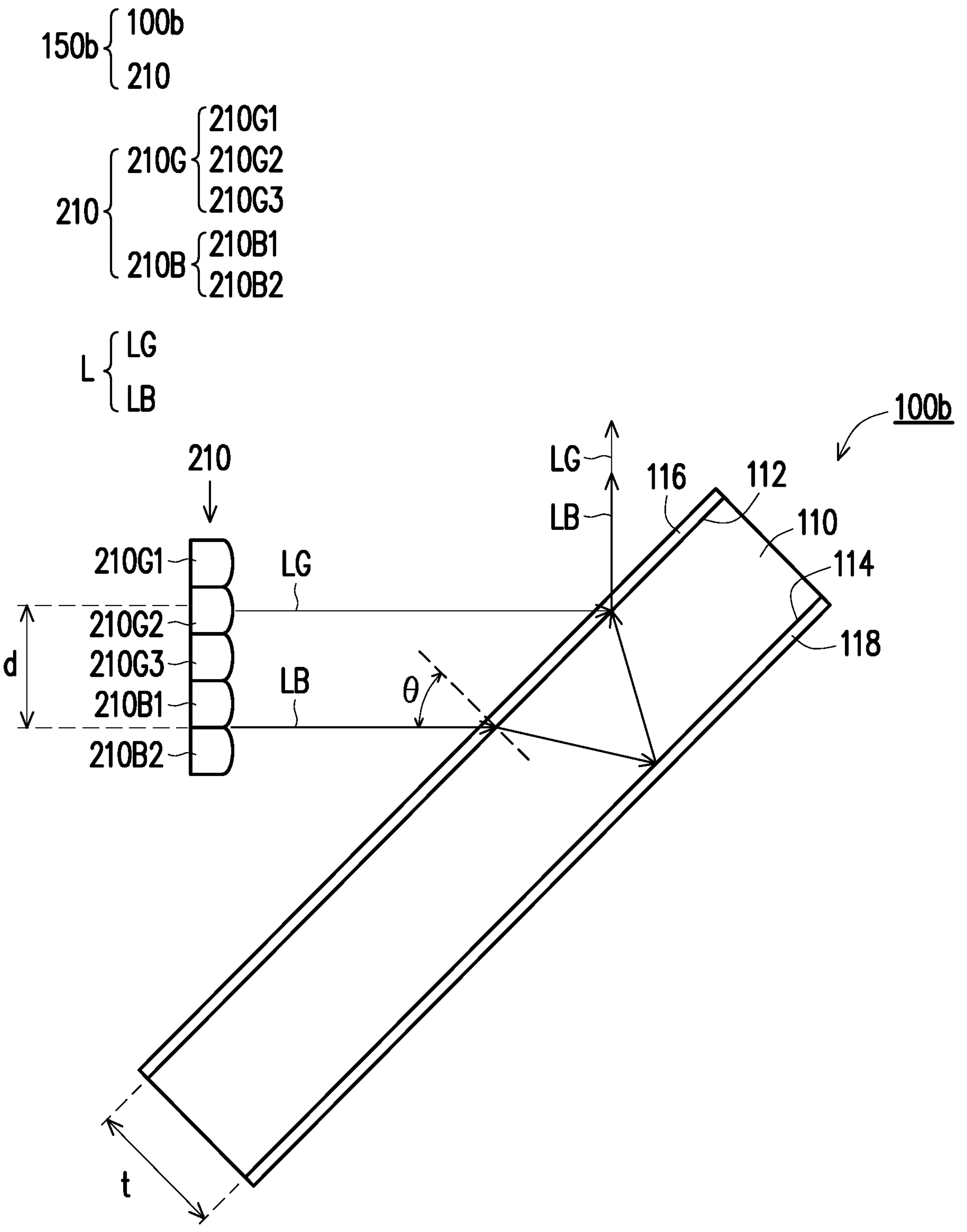
FIG. 2 is a schematic diagram of an illumination module according to an embodiment of the disclosure.

FIG. 2 is a schematic diagram of an illumination module according to an embodiment of the disclosure. An illumination module 150*b* includes a beam splitter/combiner 100*b* and a light source module 210. The illumination module 150*b* shown in FIG. 2 is similar to the illumination module 150*a* in FIG. 1. The difference between FIG. 2 and FIG. 1 is that in FIG. 2, a first color light source 210G of the light source module 210 has three first color light units 210G1, 210G2, and 210G3. That is, a number of the first color light source units in the embodiment of FIG. 2 is greater than a number of second color light source units. According to some embodiments, the number of the first color light units may be equal to or less than the number of the second color light units, and the disclosure is not limited thereto. Since the first color light source 210G has three first color light units 210G1, 210G2, and 210G3, a light spot formed when a first color beam LG emitted by the first color light source 210G is incident on the beam splitter/combiner 100*b* is larger than a light spot formed when a second color beam LB emitted by the second color light source 210B with two second color light units 210B1 and 210B2 is incident on the beam splitter/combiner 100*b*. Therefore, when the first color beam LG and the second color beam LB are incident at an incidence angle θ on a light-transmitting substrate 110 of the beam splitter/combiner 100*b*, the light spot projected by the first color beam LG on a first optical surface 112 of the beam splitter/combiner 100*b* will be larger than the light spot projected by the second color beam LB on the first optical surface 112 of the beam splitter/combiner 100*b*.

Although the first color beam LG and the second color beam LB have different light spot sizes projected on the first optical surface 112 of the beam splitter/combiner 100*b*, paths of the first color beam LG and the second color beam LB leaving the light-transmitting substrate 110 may be the same by changing a thickness of the light-transmitting substrate 110. The geometric centers of the light spots formed by the first color beam LG and the second color beam LB coincide with each other.

According to some embodiments, as shown in FIG. 2, the first color light units 210G1, 210G2, and 210G3 of the first color light source 210G are combined to emit the first color beam LG, and the second color light units 210B1 and 210B2 of the second color light source 210B are combined to emit the second color beam LB. An optical axis of the first color beam LG is in the middle of the first color light units 210G1, 210G2, and 210G3. An optical axis of the second color beam LB is in the middle of the second color light units 210B1 and 210B2.

When the first color beam LG emitted by the first color light source 210G is incident on the light-transmitting substrate 110, the first color beam LG incident on the light-transmitting substrate 110 is reflected by a first light transmission element 116 and leaves the light-transmitting substrate 110.

When the second color beam LB emitted by the second color light source 210B is incident on the light-transmitting substrate 110, the second color beam LB passes through the first light transmission element 116, then the second color beam LB is reflected by the second light transmission element 118, then passes through the first light transmission element 116, and leaves the light-transmitting substrate 110.

In order to coincide the paths of the first color beam LG and the second color beam LB leaving the light-transmitting substrate 110, the beam splitter/combiner 100*b* satisfies the following conditions.

The first optical surface 112 and a second optical surface 114 are parallel to each other. When a distance between the optical axis of the first color beam LG and the optical axis of the second color beam LB before they are incident on the first optical surface 112 is d, refractive index of the light-transmitting substrate 110 is n, and an angle (incidence angle) between the incident first color beam LG (the second color beam LB) and the normal line of the first optical surface 112 is θ, a thickness of the light-transmitting substrate 110 is t, $$t = \frac{\sqrt{n^2 - \sin^2\theta}}{\sin 2\theta} \times d.$$

In these conditions, the path of the first color beam LG leaving the light-transmitting substrate 110 is the same as the path of the second color beam LB leaving the light-transmitting substrate 110, that is, when the first color beam LG and the second color beam LB leave the light-transmitting substrate 110, center axes of the first color beam LG and the second color beam LB are aligned with each other and combined. In addition, the geometric centers of the respective light spots formed by the first color beam LG and the second color beam LB when leaving the light-transmitting substrate 110 coincide.

Although the light spot sizes of the first color beam LG and the second color beam LB are different, by designing the thickness t of the light-transmitting substrate 110 of the beam splitter/combiner 100*b*, emission positions (the positions when the first color beam LG and the second color beam LB leaving the light-transmitting substrate 110) of the first color beam LG and the second color beam LB may be adjusted so that the first color beam LG and the second color beam LB are combined by aligning the center axes of the beams.

According to some embodiments, if the emission positions of the first color beam LG and the second color beam LB are changed to incident positions, paths of the first color beam LG and the second color beam LB incident on the light-transmitting substrate 110 coincide. The beam splitter/combiner 100*b* may split the first color beam LG and the second color beam LB of an illumination beam L. The emission positions of the first color beam LG and the second color beam LB after being split may be controlled by adjusting the thickness t of the light-transmitting substrate 110.

Figure 3:
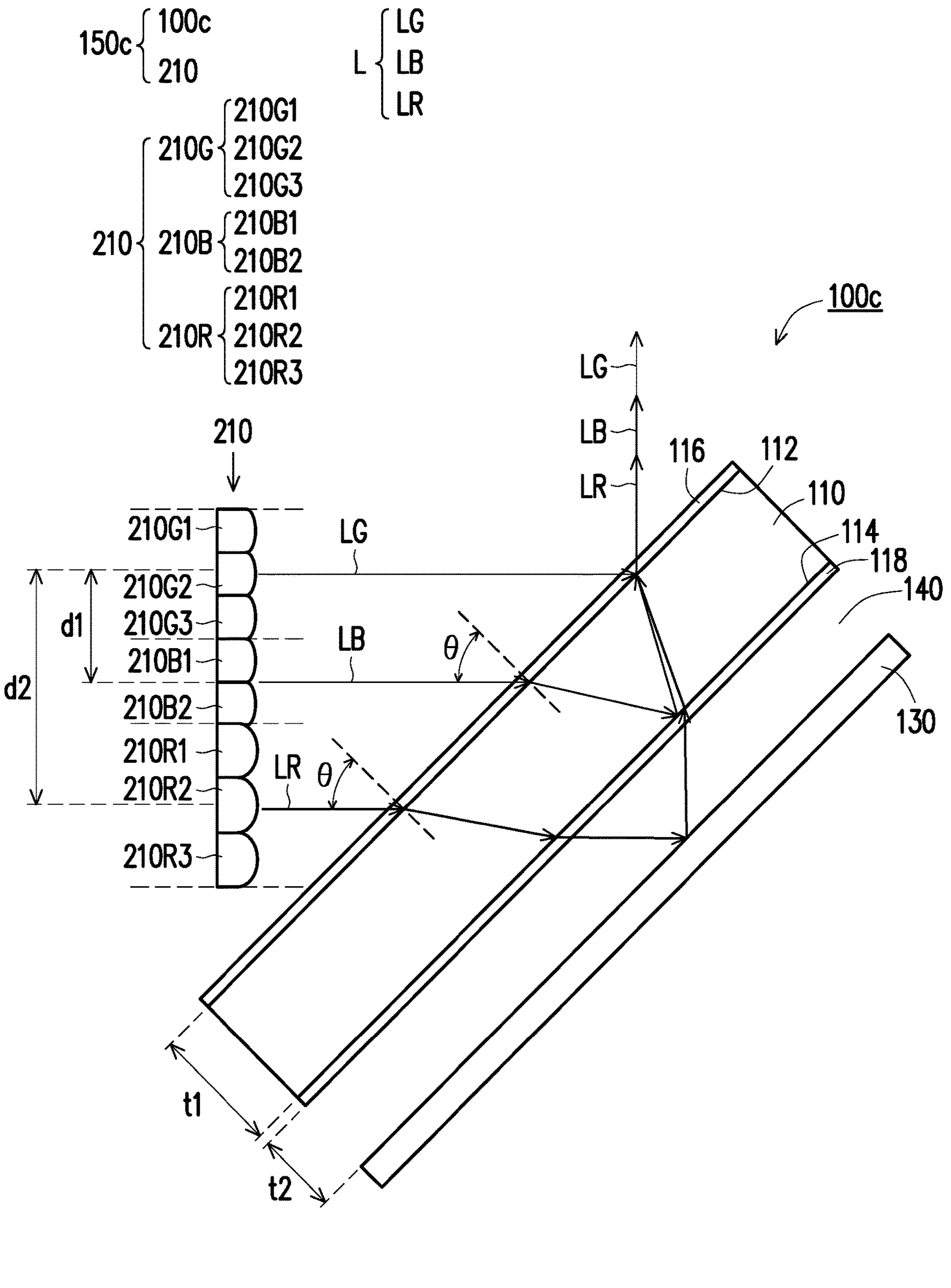
FIG. 3 is a schematic diagram of an illumination module according to another embodiment of the disclosure.

FIG. 3 is a schematic diagram of an illumination module according to another embodiment of the disclosure. An illumination module 150*c* includes a beam splitter/combiner 100*c* and a light source module 210. The illumination module 150*c* shown in FIG. 3 is similar to the illumination module 150*b* shown in FIG. 2. The difference is that the light source module 210 in FIG. 3 includes not only a first color light source 210G and a second color light source 210B, but also a third color light source 210R. The third color light source 210R includes third color light source units 210R1, 210R2, and 210R3. According to some embodiments, a number of the third color light source units of the third color light source 210R may be one or more than one, and the disclosure is not limited thereto. The third color light source units 210R1, 210R2, and 210R3 are combined to emit a third color beam LR. The third color beam LR is parallel to a first color beam LG and a second color beam LB. Further, a wavelength of the first color beam LG, a wavelength of the second color beam LB, and a wavelength of the third color beam LR are not the same as each other. According to this embodiment, the first color light source 210G is, for example, a green light source to generate a green light beam (the first color beam), and the second color light source 210B is, for example, a blue light source to generate a blue light beam (the second color beam), and the third color light source 210R is, for example, a red light source to generate a red light beam (the third color beam). Since the third color light source 210R has three third color light source units 210R1, 210R2, and 210R3, a light spot formed when the third color beam LR emitted by the third color light source 210R is incident on the beam splitter/combiner 100*c* is larger than a light spot formed when the second color beam LB emitted by the second color light source 210B with two second color light units 210B1 and 210B2 is incident on the beam splitter/combiner 100*c*. Therefore, when the third color beam LR and the second color beam LB are incident at an incidence angle θ on a light-transmitting substrate 110 of the beam splitter/combiner 100*c*, the light spot projected by the third color beam LR on a first optical surface 112 of the beam splitter/combiner 100*c* will be larger than the light spot projected by the second color beam LB on the first optical surface 112 of the beam splitter/combiner 100*c*. In addition, in FIG. 3, the beam splitter/combiner 100*c* further includes a third light transmission element 130. According to some embodiments, the third light transmission element 130 is a flat mirror. A gas layer 140 is located between the third light transmission element 130 and the second light transmission element 118. According to some embodiments, a material of the gas layer 140 is air, but the disclosure is not limited thereto.

Although light spot sizes projected by the first color beam LG, the second color beam LB, and the third color beam LR on the first optical surface 112 of the beam splitter/combiner 100*c* are different, by designing a thickness t1 of the light-transmitting substrate 110 and a thickness t2 of the gas layer 140, paths of the first color beam LG, the second color beam LB, and the third color beam LR leaving the light-transmitting substrate 110 may coincide.

According to some embodiments, as shown in FIG. 3, the first color light units 210G1, 210G2, and 210G3 of the first color light source 210G are combined to emit the first color beam LG. The second color light units 210B1 and 210B2 of the second color light source 210B are combined to emit the second color beam LB. The third color light source units 210R1, 210R2, and 210R3 of the third color light source 210R are combined to emit the third color beam LR. An optical axis of the first color beam LG is in the middle of the first color light units 210G1, 210G2, and 210G3. An optical axis of the second color beam LB is in the middle of the second color light units 210B1 and 210B2. An optical axis of the third color beam LR is in the middle of the third color light source unit 210R1, 210R2, and 210R3.

When the first color beam LG emitted by the first color light source 210G is incident on the light-transmitting substrate 110, the first color beam LG incident on the light-transmitting substrate 110 is reflected by a first light transmission element 116 and leaves the light-transmitting substrate 110.

When the second color beam LB emitted by the second color light source 210B is incident on the light-transmitting substrate 110, the second color beam LB incident on the light-transmitting substrate 110 passes through the first light transmission element 116, then the second color beam LB is reflected by the second light transmission element 118, then passes through the first light transmission element 116 and leave the light-transmitting substrate 110.

When the third color beam LR emitted by the third color light source 210R is incident on the light-transmitting substrate 110, the third color beam LR incident on the light-transmitting substrate 110 passes through the first light transmission element 116, the second light transmission element 118, and the gas layer 140, and then is reflected by the third light transmission element 130, passes through the gas layer 140, the second light transmission element 118, and the first light transmission element 116 sequentially, and leaves the light-transmitting substrate 110.

In order to coincide the paths of the first color beam LG, the second color beam LB, and the third color beam LR leaving the light-transmitting substrate 110, the beam splitter/combiner 100*c* satisfies the following conditions.

The second color beam LB is located between the first color beam LG and the third color beam LR. The first optical surface 112, a second optical surface 114, and the third light transmission element 130 are parallel to each other. When a distance between the optical axis of the first color beam LG and the optical axis of the second color beam LB is d1, and a distance between the optical axis of the first color beam LG and the optical axis of the third color beam LR is d2, refractive index of the light-transmitting substrate 110 is n, and an angle (incidence angle) between the incident first color beam LG, the second color beam LB, the third color beam LR, and the normal line of the first optical surface 112 is θ, a thickness of the light-transmitting substrate 110 is t1, $$t1 = \frac{\sqrt{n^2 - \sin^2\theta}}{\sin 2\theta} \times d1,$$

a thickness of the gas layer 140 is t2, $$t2 = \frac{d2 - d1}{2 \times \sin\theta}.$$

At these conditions, the paths of the first color beam LG, the second color beam LB, and the third color beam LR leaving the light-transmitting substrate 110 are the same, that is, center axes of the first color beam LG, the second color beam LB, and the third color beam LR are aligned with each other and combined. In addition, geometric centers of the respective light spots formed by the first color beam LG, the second color beam LB, and the third color beam LR when leaving the light-transmitting substrate 110 coincide.

According to some embodiments, the incidence angle θ of the first color beam LG, the second color beam LB, and the third color beam LR incident on the first optical surface 112 of the light-transmitting substrate 110 (i.e., the angle between the first color beam LG, the second color beam LB, the third color beam LR, and the normal line of the first optical surface 112) falls roughly in a range of 30 degrees to 75 degrees. Considering the thickness of the light-transmitting substrate and the size of the beam splitter/combiner, the incidence angle θ falls roughly in a range of 30 degrees to 60 degrees. According to some embodiments, the incidence angle θ is roughly 45 degrees.

Although light spot sizes of the first color beam LG, the second color beam LB, and the third color beam LR are different, by designing the thickness t1 of the light-transmitting substrate 110 and the thickness t2 of the of the gas layer 140 of the beam splitter/combiner 100*c*, emission positions of the first color beam LG, the second color beam LB, and the third color beam LR leaving the light-transmitting substrate 110 may be adjusted so that the first color beam LG, the second color beam LB, and the third color beam LR are combined by aligning the center axes of the beams.

It should be noted that the illumination module 150*c* in FIG. 3 includes a beam splitter/combiner 100*c* and a light source module 210, which may be provided with the light valve 220 and the projection lens 230 shown in FIG. 1 to form a projection apparatus according to another embodiment of the disclosure. The structure of the light valve 220 and the projection lens 230 are as described above, and therefore will not be repeated in the following.

Figure 4:
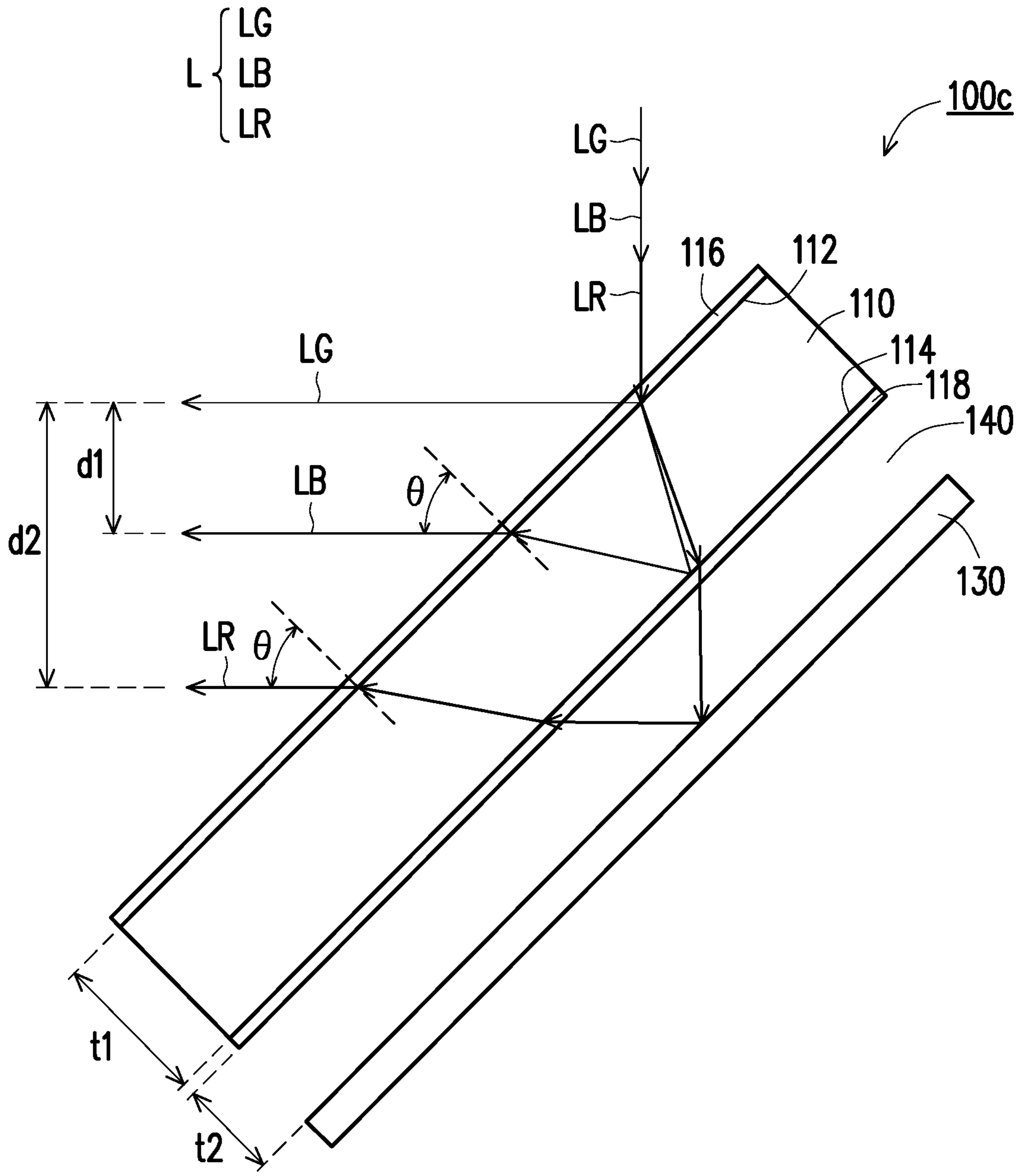
FIG. 4 is a schematic diagram of a beam splitter/combiner according to an embodiment of the disclosure.

FIG. 4 is a schematic diagram of a beam splitter/combiner according to an embodiment of the disclosure. The difference between FIG. 4 and FIG. 3 lies in a direction of the optical path, where emission positions of the first color beam LG, the second color beam LB, and the third color beam LR in FIG. 3 are changed to incident positions, paths of the first color beam LG, the second color beam LB, and the third color beam LR incident on the light-transmitting substrate 110 coincide, and geometric centers of light spots formed by the first color beam LG, the second color beam LB, and the third color beam LR incident on the light-transmitting substrate 110 coincide. As shown in FIG. 4, a beam splitter/combiner 100*c* may split a first color beam LG, a second color beam LB, and a third color beam LR of an illumination beam L. Emission positions of the first color beam LG, the second color beam LB, and the third color beam LR after being split may be controlled by adjusting a thickness t1 of the light-transmitting substrate 110 and a thickness t2 of a gas layer 140.

Figure 5:
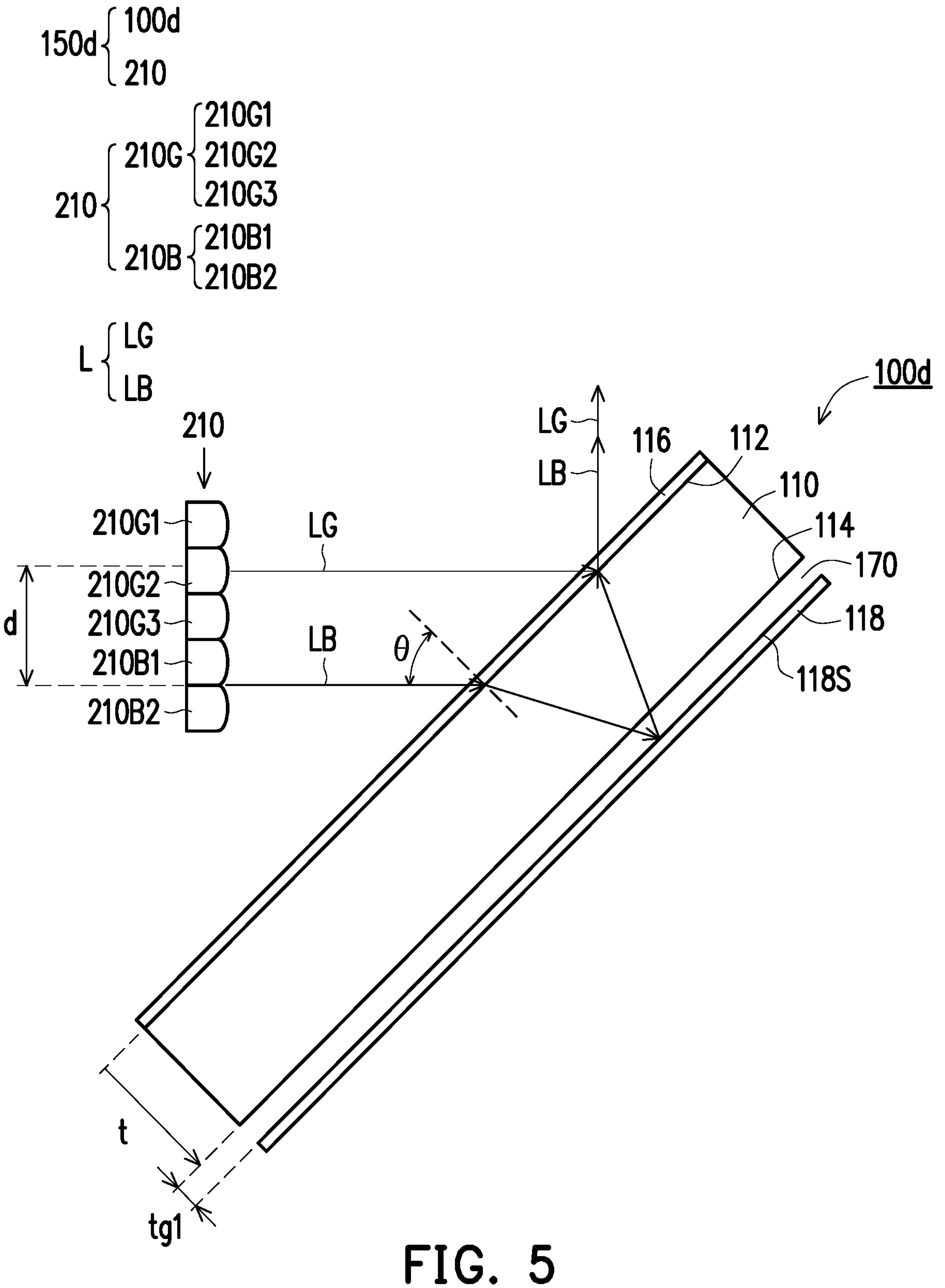
FIG. 5 is a schematic diagram of an illumination module according to another embodiment of the disclosure.
Figure 6:
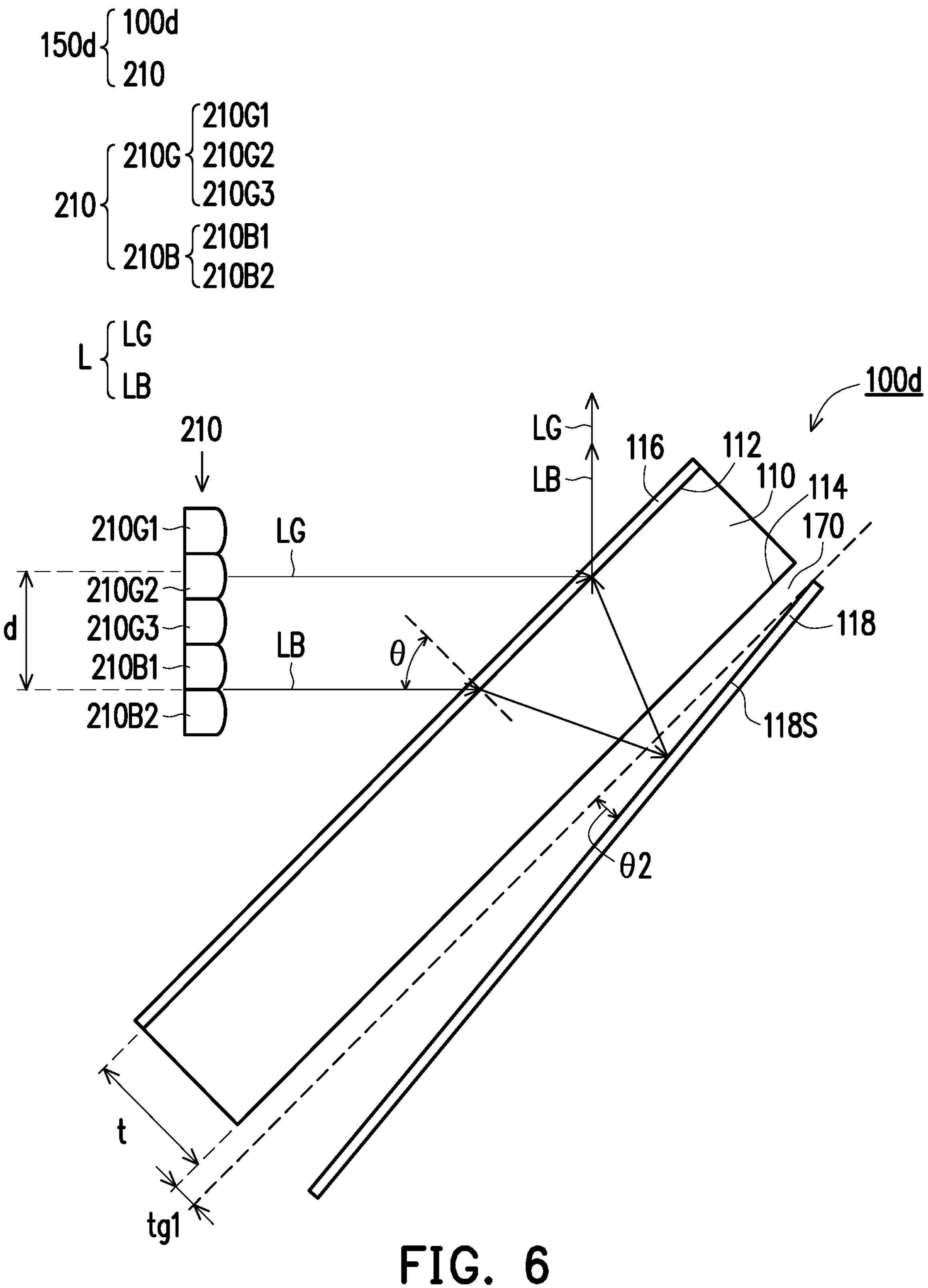
FIG. 6 is a schematic diagram of an illumination module according to another embodiment of the disclosure.

FIG. 5 and FIG. 6 are schematic diagrams of an illumination module according to another embodiment of the disclosure. Referring to FIG. 5 and FIG. 6 at the same time, an illumination module 150*d* includes a beam splitter/combiner 100*d* and a light source module 210. The first color beam LG emitted by the light source module 210 is parallel to the second color beam LB. According to some embodiments, the first color beam LG and the second color beam LB do not form the same light spot size on the light-transmitting substrate 110, and the geometric centers of the light spots formed by the first color beam LG and the second color beam LB incident on or leaving the light-transmitting substrate 110 coincide. According to other embodiments, the first color beam LG and the second color beam LB form the same size light spots on the light-transmitting substrate 110.

The illumination module 150*d* shown in FIG. 5 is similar to the illumination module 150*b* shown in FIG. 2. The difference is that in FIG. 5, there is a gap, i.e., a gas layer 170, between the second light transmission element 118 and the light-transmitting substrate 110. According to some embodiments, a thickness tg1 of the gas layer 170 is about 0 to 2 mm, but is not limited thereto. In the embodiment of FIG. 5, the first light transmission element 116 is a coating, such as a dielectric coating layer with a light splitting function. According to the embodiment of FIG. 5, the second light transmission element 118 is an adjustable flat mirror to provide a reflection effect to the second color beam LB. According to some embodiments, the second light transmission element 118 is substantially parallel to the second optical surface 114. According to some embodiments, the material of the first light transmission element 116 is not the same as the material of the second light transmission element 118. According to some embodiments, the thickness of the first light transmission element 116 is not the same as the thickness of the second light transmission element 118.

When the first color beam LG emitted by the first color light source 210G is incident on the light-transmitting substrate 110, the first color beam LG incident on the light-transmitting substrate 110 is reflected by the first light transmission element 116 and leaves the light-transmitting substrate 110.

When the second color beam LB emitted by the second color light source 210B is incident on the light-transmitting substrate 110, after the second color beam LB passes through the first light transmission element 116, the second color beam LB sequentially passes through the second optical surface 114 and the gas layer 170, is reflected by a reflective surface 118S of the second light transmission element 118, passes through the gas layer 170, the second optical surface 114 sequentially, and then passes through the first light transmission element 116 and leaves the light-transmitting substrate 110.

The displacement of the path of the first color beam LG leaving the light-transmitting substrate 110 and the path of the second color beam LB leaving the light-transmitting substrate 110 is related to the distance d between the first color beam LG and the second color beam LB before they are incident on the light-transmitting substrate 110, the refractive index n of the light-transmitting substrate 110, and the incidence angle θ of the first color beam LG (the second color beam LB) incident on the first optical surface 112 of the light-transmitting substrate 110.

According to some embodiments, when the first optical surface 112 is parallel to the second optical surface 114, and when the distance between the first color beam LG and the second color beam LB is d, the refractive index of the light-transmitting substrate 110 is n, the angle between the first color beam LG and the normal line of the first optical surface 112 is "θ", then the thickness of the light-transmitting substrate 110 is t, $$t = \frac{\sqrt{n^2 - \sin^2\theta}}{\sin 2\theta} \times d.$$

At these conditions, the paths of the second color beam LB and the first color beam LG leaving the light-transmitting substrate 110 are the same, that is, the center axes of the second color beam LB and the first color beam LG are aligned with each other and combined.

According to some embodiments, the incidence angle θ of the first color beam LG and the second color beam LB incident on the first optical surface 112 of the light-transmitting substrate 110 (i.e., the angle between the first color beam LG1 and the second color beam LB1 and the normal line of the first optical surface 112) falls roughly in the range of 30 degrees to 75 degrees. Considering the thickness of the light-transmitting substrate and the size of the beam splitter/combiner, the incidence angle θ is roughly in the range of 30 degrees to 60 degrees. According to some embodiments, the incidence angle θ is roughly 45 degrees.

During the manufacturing process of the illumination module 150*d*, due to various manufacturing tolerances in the process, it is possible that the paths of the first color beam LG and the second color beam LB cannot be coincident when they leave the light-transmitting substrate 110, resulting in an asymmetry in the image uniformity of the first color beam and the second color beam (e.g., green light and blue light) due to the light source emission factor. Thus, by adjusting the relative angle between the second light transmission element 118 and the second optical surface 114, the path of the second color beam LB leaving the light-transmitting substrate 110 after being reflected by the reflective surface 1185 of the second light transmission element 118 coincides with the path of the first color beam LG leaving the light transmitting substrate 110.

According to some embodiments, a relative angle θ2 between the second light transmission element 118 and the second optical surface 114 may be regulated, and the relative angle θ2 ranges from −1 degree to 1 degree. According to other embodiments, the relative angle θ2 ranges from −0.5 degrees to 0.5 degrees. As shown in FIG. 6, by adjusting the relative angle θ2 between the second light transmission element 118 and the second optical surface 114, the path of the second color beam LB reflected by the reflective surface 1185 of the second light transmission element 118 may coincide with the path of the first color beam LG when leaving the light-transmitting substrate 110.

Thus, due to a gas layer 170 between the second light transmission element 118 and the second optical surface 114, so that the second light transmission element 118 is adjustable in angle, the path of the second color beam LB and the first color beam LG leaving the light-transmitting substrate 110 may coincide by adjusting the relative angle between the second light transmission element 118 and the second optical surface 114, so as to improve the color uniformity when imaging.

Figure 7:
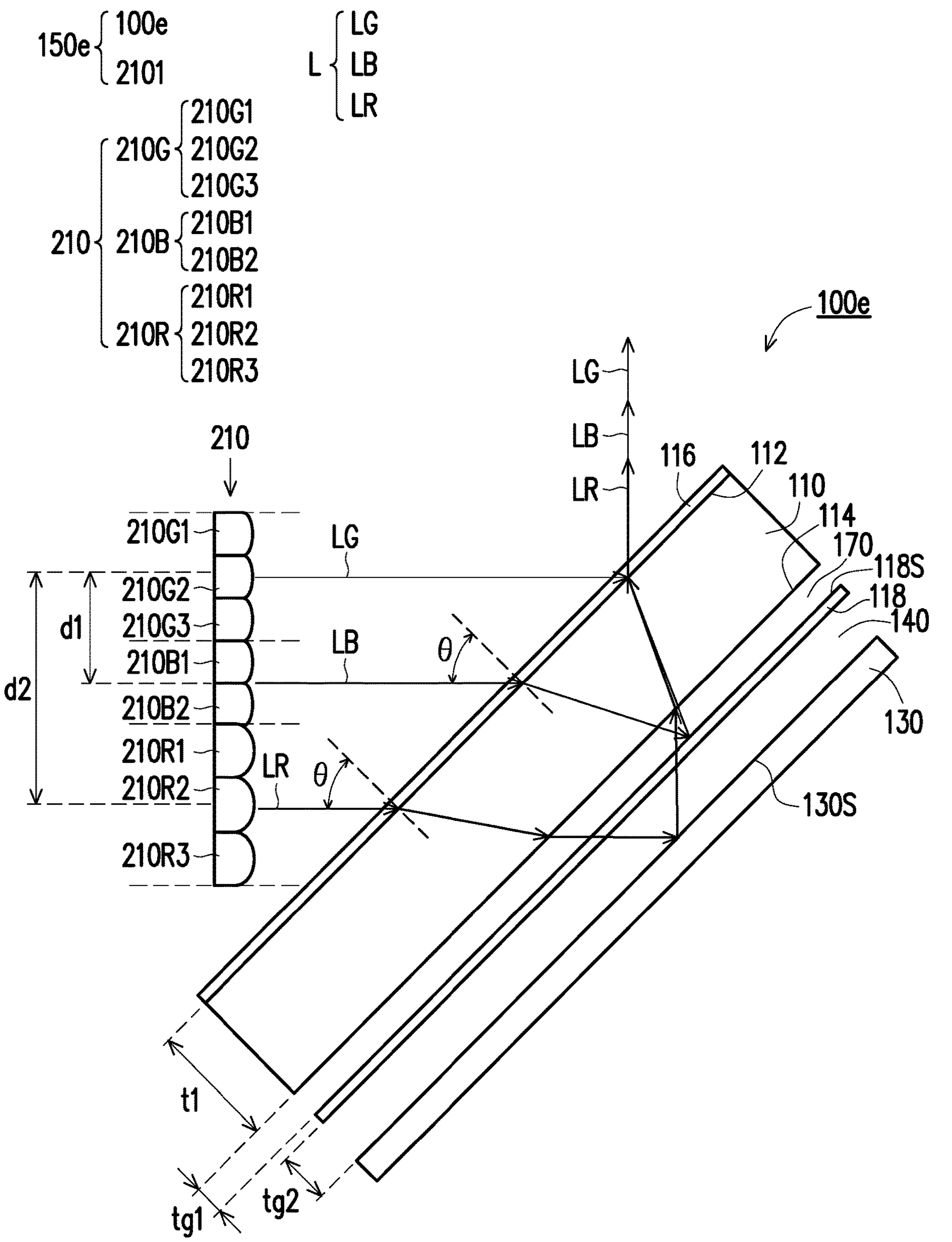
FIG. 7 is a schematic diagram of an illumination module according to another embodiment of the disclosure.
Figure 8:
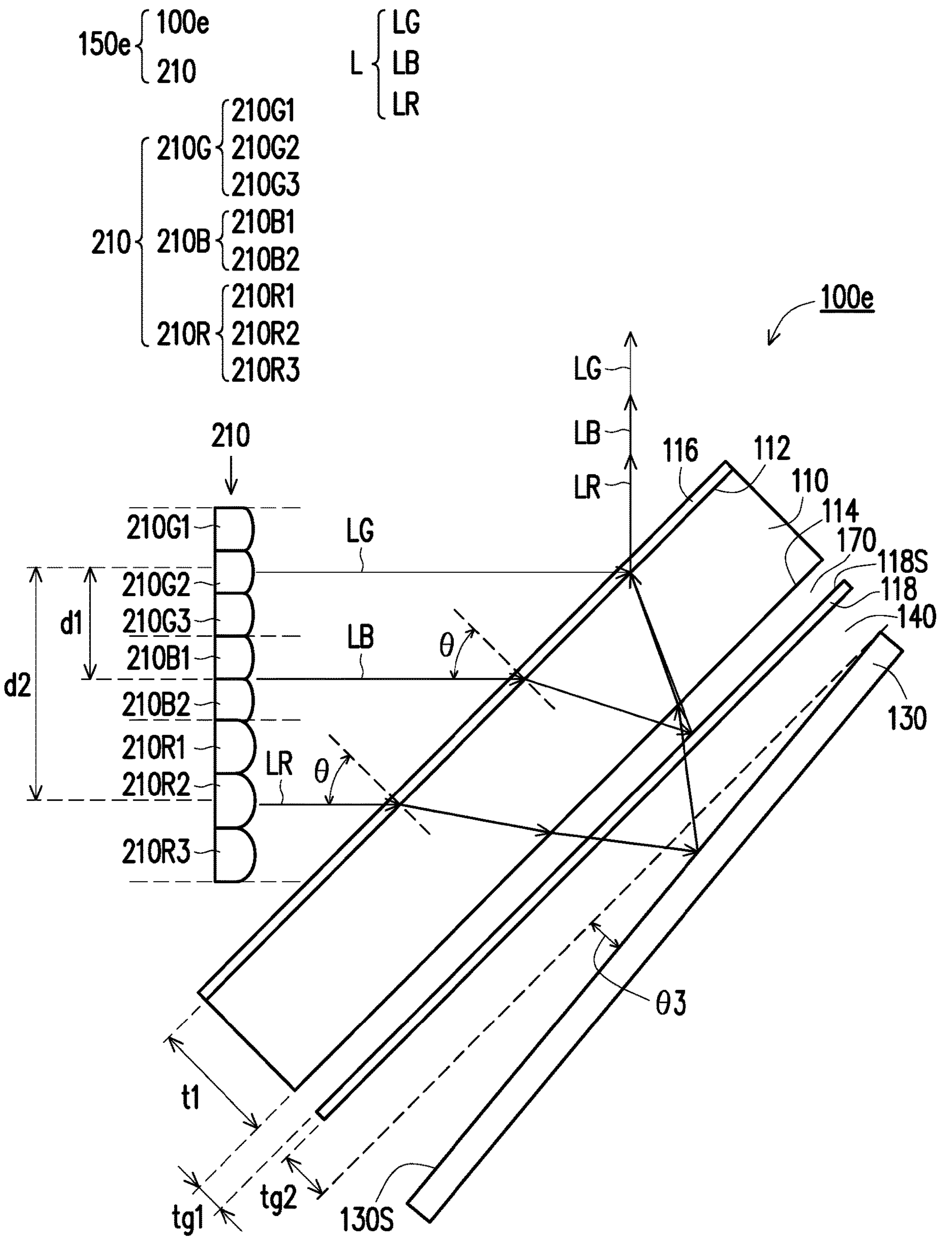
FIG. 8 is a schematic diagram of an illumination module according to another embodiment of the disclosure.

FIG. 7 and FIG. 8 are schematic diagrams of an illumination module according to another embodiment of the disclosure. Referring to FIG. 7 and FIG. 8 at the same time, an illumination module 150*e* includes a beam splitter/combiner 100*e* and a light source module 210. The illumination module 150*e* shown in FIG. 7 is similar to the illumination module 150*c* in FIG. 3. The difference between FIG. 7 and FIG. 3 is that in FIG. 7, there is a gap, i.e., a gas layer 170, between the second light transmission element 118 and the light-transmitting substrate 110. The illumination module 150*e* includes a third light transmission element 130. There is a gas layer 140 between the third light transmission element 130 and the second light transmission element 118. According to some embodiments, the second light transmission element 118 may reflect the second color beam LB and allow the third color beam LR to pass through. According to the embodiment of FIG. 7, the first light transmission element 116 is a coating, such as a dielectric coating layer with a light splitting function. According to the embodiment of FIG. 7, the second light transmission element 118 is a coating film attached to an adjustable thin substrate, such as a dielectric coating layer with a light splitting function attached to the adjustable thin substrate. The thin substrate is only configured as a carrier for the coating film, so it is necessary to minimize the influence of the thickness of the thin substrate on the refraction of the light beam. As a result, a thickness of the thin substrate is much smaller than the thickness of the light-transmitting substrate 110. According to the embodiment of FIG. 7, the third light transmission element 130 is an adjustable flat mirror, or the third light transmission element 130 may also be a coating film attached to an adjustable thin substrate, such as a dielectric coating layer with a light splitting function attached to the adjustable thin substrate to provide reflection effect to the third color beam LR. In addition, the thin substrate is only configured as a carrier for the coating, so it is necessary to minimize the influence of the thickness of the thin substrate on the refraction of the light beam. As a result, a thickness of the thin substrate is much smaller than the thickness of the light-transmitting substrate 110. According to some embodiments, the third light transmission element 130 is substantially parallel to the second optical surface 114. According to some embodiments, the material of the first light transmission element 116 is not the same as the material of third light transmission element 130. According to some embodiments, the thickness of the first light transmission element 116 is not the same as the thickness of third light transmission element 130.

When the first color beam LG emitted by the first color light source 210G is incident on the light-transmitting substrate 110, the first color beam LG incident on the light-transmitting substrate 110 is reflected by the first light transmission element 116 and leaves the light-transmitting substrate 110.

When the second color beam LB emitted by the second color light source 210B is incident on the light-transmitting substrate 110, after the second color beam LB passes through the first light transmission element 116, the second color beam LB sequentially passes through the second optical surface 114 and the gas layer 170, and then is reflected by the reflective surface 118S of the second light transmission element 118, passes through the gas layer 170, the second optical surface 114 sequentially, and then passes through the first light transmission element 116 and leaves the light-transmitting substrate 110.

When the third color beam LR emitted by the third color light source 210R is incident on the light-transmitting substrate 110, the third color beam LR incident on the light-transmitting substrate 110 passes through the first light transmission element 116, the second light transmission element 118, and the gas layer 140, and then the third color beam LR is reflected by the third light transmission element 130, and then passes through the gas layer 140, the second light transmission element 118, and the first light transmission element 116 sequentially, and leaves the light-transmitting substrate 110.

The displacement of the path of the first color beam LG leaving the light-transmitting substrate 110 and the path of the second color beam LB leaving the light-transmitting substrate 110 relative to the path of the third color beam LR leaving the light-transmitting substrate 110 is related to the distance d1 between the first color beam LG and the second color beam LB before they are incident on the light-transmitting substrate 110, the distance d2 between the first color beam LG and the third color beam LR before they are incident on the light-transmitting substrate 110, the refractive index n of the light-transmitting substrate 110, and the incidence angle θ of the first color beam LG and the second color beam LB incident on the first optical surface 112 of the light-transmitting substrate 110.

According to some embodiments, when the distance between the first color beam LG and the second color beam LB is d1, the distance between the first color beam LG and the third color beam LR is d2, the refractive index of the light-transmitting substrate 110 is n, the angle between the first color beam LG and the normal line of the first optical surface 112 is "θ", then the thickness of the light-transmitting substrate 110 is t1, $$t1 = \frac{\sqrt{n^2 - \sin^2\theta}}{\sin 2\theta} \times d1,$$

the thickness of the gas layer 140 is tg2, $$tg2 = \frac{d2 - d1}{2 \times \sin\theta}.$$

According to some embodiments, the incidence angle θ of the first color beam LG, the second color beam LB, and the third color beam LR incident on the first optical surface 112 of the light-transmitting substrate 110 (i.e., the angle between the first color beam LG1, the second color beam LB1, and the third color beam LR and the normal line of the first optical surface 112) falls roughly in the range of 30 degrees to 75 degrees. Considering the thickness of the light-transmitting substrate and the size of the beam splitter/combiner, the incidence angle θ is roughly in the range of 30 degrees to 60 degrees. According to some embodiments, the incidence angle θ is roughly 45 degrees.

During the manufacturing process of the illumination module 150*e*, due to various manufacturing tolerances in the process, it is possible that the paths of the first color beam LG, the second color beam LB, and the third color beam LB cannot be coincident when they leave the light-transmitting substrate 110, resulting in an asymmetry in the image uniformity of the first color beam, the second color beam, and the third color beam (e.g., green light, blue light, and red light) due to the light source emission factor. Thus, by adjusting the relative angle between the second light transmission element 118 and the second optical surface 114, the path of the second color beam LB leaving the light-transmitting substrate 110 after being reflected by the reflective surface 1185 of the second light transmission element 118 coincides with the path of the first color beam LG leaving the light transmitting substrate 110. By adjusting the relative angle between the third light transmission element 130 and the second optical surface 114, the path of the third color beam LR passing through the second light transmission element 118 and leaving the light-transmitting substrate 110 after being reflected by a reflective surface 130S of the third light transmission element 130 coincides with the path of the first color beam LG leaving the light-transmitting substrate 110.

According to some embodiments, a relative angle θ3 between the third light transmission element 130 and the second optical surface 114 may be regulated, and the relative angle θ3 ranges from −1 degree to 1 degree. According to other embodiments, the relative angle θ3 ranges from −0.5 degrees to 0.5 degrees. As shown in FIG. 8, by adjusting the relative angle θ2 between the second light transmission element 118 and the second optical surface 114, the path of the second color beam LB reflected by the reflective surface 1185 of the second light transmission element 118 leaving the light-transmitting substrate 110 may coincide with the path of the first color beam LG leaving the light-transmitting substrate 110. After determining the relative angle θ2 between the second light transmission element 118 and the second optical surface 114, the relative angle θ3 between the third light transmission element 130 and the second optical surface 114 is adjusted so that the path of the third color beam LR reflected by the reflective surface 130S of the third light transmission element 130 leaving the light-transmitting substrate 110 may coincide with the path of the first color beam LG leaving the light-transmitting substrate 110.

Thus, by adjusting the relative angle θ2 between the second light transmission element 118 and the second optical surface 114 and adjusting the relative angle θ3 between the third light transmission element 130 and the second optical surface 114, the paths of the second color beam LB and the third color beam LR and the first color beam LG leaving the light-transmitting substrate 110 may coincide, so as to improve the color uniformity when imaging.

Figure 9:
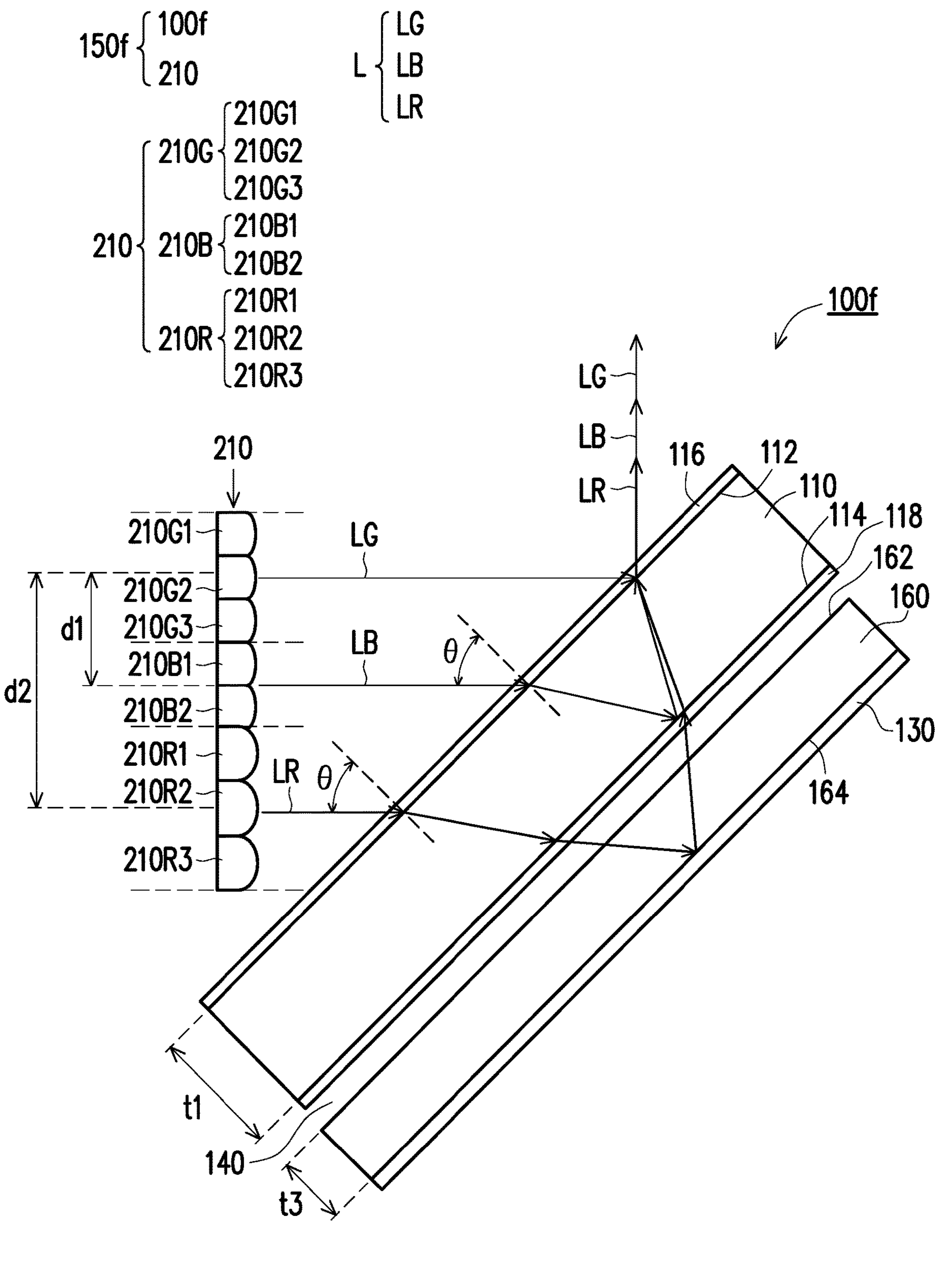
FIG. 9 is a schematic diagram of an illumination module according to another embodiment of the disclosure.

FIG. 9 is a schematic diagram of an illumination module according to another embodiment of the disclosure. An illumination module 150*f* includes a beam splitter/combiner 100*f* and the light source module 210. The illumination module 150*f* shown in FIG. 9 is similar to the illumination module 150*c* in FIG. 3. The difference between FIG. 9 and FIG. 3 is that the beam splitter/combiner 100*f* also includes a light-transmitting substrate 160. The light-transmitting substrate 160 is located between the second light transmission element 118 and the third light transmission element 130, and the third light transmission element 130 is located on the light-transmitting substrate 160. Specifically, the light-transmitting substrate 160 has a third optical surface 162 facing the light-transmitting substrate 110 and a fourth optical surface 164 opposite to the third optical surface 162, and the light transmission element 130 is located on the fourth optical surface 164 of the light-transmitting substrate 160. According to some embodiments, a material of the light-transmitting substrate 160 may be glass or other light-transmitting materials, but the disclosure is not limited thereto. According to some embodiments, there is a gas layer 140 between the light-transmitting substrate 160 and the second light transmission element 118. According to some embodiments, the gas layer 140 may also be omitted, so the light-transmitting substrate 160 is located on the second light transmission element 118 and is in direct contact with the second light transmission element 118. According to the embodiment of FIG. 9, the first light transmission element 116 is a coating film attached to the light-transmitting substrate 110, such as a dielectric coating layer with a light-splitting function attached to the light-transmitting substrate 110. According to the embodiment of FIG. 9, the second light transmission element 118 is a coating film attached to the light-transmitting substrate 110, such as a dielectric coating layer with a light-splitting function attached to the light-transmitting substrate 110. According to the embodiment of FIG. 9, the third light transmission element 130 is a coating film attached to the light-transmitting substrate 160, such as a dielectric coating layer with a light-splitting function attached to the light-transmitting substrate 160, or a reflective mirror layer formed by a metallic coating attached to the light-transmitting substrate 160 to provide a reflective effect on the third color light beam LR.

When the first color beam LG emitted by the first color light source 210G is incident on the light-transmitting substrate 110, the first color beam LG incident on the light-transmitting substrate 110 is reflected by the first light transmission element 116 and leaves the light-transmitting substrate 110.

When the second color beam LB emitted by the second color light source 210B is incident on the light-transmitting substrate 110, after the second color beam LB passes through the first light transmitting element 116, the second color beam LB passes through the second optical surface 114, is reflected by the second light transmitting element 118, and then passes through the first light transmitting element 116 and leaves the light-transmitting substrate 110.

When the third color beam LR emitted by the third color light source 210R is incident on the light-transmitting substrate 110, the third color beam LR incident on the light-transmitting substrate 110 passes through the first light transmission element 116, the second light transmission element 118, and the gas layer 140, the third color beam LR continues to pass through the light-transmitting substrate 160, is reflected by the third light transmission element 130, passes through the light-transmitting substrate 160, the gas layer 140, the second light transmission element 118, and the first light transmission element 116 sequentially, and leaves the light-transmitting substrate 110.

By adjusting the thickness t1 of the light-transmitting substrate 110, the paths of the first color beam LG and the second color beam LB may coincide when leaving the light-transmitting substrate 110. By adjusting the thickness t1 of the light-transmitting substrate 110 and the thickness t3 of the light-transmitting substrate 160, the paths of the first color beam LG and the third color beam LR may coincide when leaving the light-transmitting substrate 110. In this case, the paths of the first color beam LG, the second color beam LB, and the third color beam LR may coincide when leaving the light-transmitting substrate 110 because only the thickness of the light-transmitting substrate 110 and the light-transmitting substrate 160 need to be adjusted. Since only one adjustment is needed to adjust the incident angle θ of the first color beam LG, it is simple to manufacture and may effectively reduce the production cost.

According to some embodiments, when the distance between the first color beam LG and the second color beam LB before they are incident on the light-transmitting substrate 110 is d1, the distance between the first color beam LG and the third color beam LR before they are incident on the light-transmitting substrate 110 is d2, the refractive index of the light-transmitting substrate 110 is n1, the refractive index of the light-transmitting substrate 160 is n2, the angle between the first color beam LG and the normal line of the first optical surface 112 is "θ", then the thickness of the light-transmitting substrate 110 is t1, $$t1 = d1 \times \frac{\sqrt{n1^2 - \sin^2\theta}}{\sin 2\theta},$$

the thickness of the light-transmitting substrate 160 is t3, $$t3 = (d2 - d1) \times \frac{\sqrt{n2^2 - \sin^2\theta}}{\sin 2\theta}.$$

In summary, the disclosure may be utilized to adjust the thickness of the light-transmitting substrate of the beam splitter/combiner, so that beams of different colors may be incident on the beam splitter/combiner to obtain a combined light effect with center axes of beams aligned with each other. On the other hand, when a color beam formed by different colors of light is incident on the beam splitter/combiner, emission positions of the different colors of light may also be changed by adjusting a thickness of the light-transmitting substrate of the beam splitter/combiner. In addition, by adjusting the angle of the light transmission element, the error in the manufacturing process may be corrected, thus enabling different colors to obtain a better combined light effect. The disclosure may further reduce the size and manufacturing difficulty of the beam splitter/combiner, and reduce the manufacturing cost of the projection apparatus.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the present disclosure is intended to be dedicated to the public regardless of whether the element or component is explicitly recited in the following claims.

What is claimed is:

1. A beam splitter/combiner comprising a first light-transmitting substrate, a first light transmission element, and a second light transmission element, wherein the first light-transmitting substrate has a first optical surface facing incident light and a second optical surface opposite to the first optical surface;

the first light transmission element is disposed on the first optical surface; and the second light transmission element is disposed on the second optical surface;

wherein a first color beam incident on the first light transmission element is reflected by the first light transmission element and leaves the first light transmission element, and a second color beam incident on the first light transmission element passes through the first light transmission element and the first light-transmitting substrate, is reflected by the second light transmission element, then passes through the first light-transmitting substrate and the first light transmission element, and leaves the first light transmission element, when a distance between the first color beam and the second color beam is d1, refractive index of the first light-transmitting substrate is n1, and an angle between the first color beam and a normal line of the first optical surface is θ, then a thickness of the first light-transmitting substrate is t, $$t = \frac{\sqrt{n1^2 - \sin^2\theta}}{\sin 2\theta} \times d1.$$

and wherein paths of the first color beam and the second color beam incident on or leaving the first light-transmitting substrate coincide.

2. The beam splitter/combiner according to claim 1, wherein the first color beam is substantially parallel to the second color beam.

3. The beam splitter/combiner according to claim 1, wherein when incident positions of the first color beam and the second color beam on the first light transmission element are different, emission positions of the first color beam and the second color beam leaving the first light transmission element are coincide, or when the incident positions of the first color beam and the second color beam incident on the first light transmission element are coincide, the emission positions of the first color beam and the second color beam leaving the first light transmission element are different.

4. The beam splitter/combiner according to claim 1, wherein a material of the first light transmission element is different from a material of the second light transmission element.

5. The beam splitter/combiner according to claim 1, wherein a thickness of the first light transmission element is different from a thickness of the second light transmission element.

6. The beam splitter/combiner according to claim 1, wherein a gas layer is located between the second light transmission element and the first light-transmitting substrate.

7. The beam splitter/combiner according to claim 1, wherein the second light transmission element is a mirror.

8. The beam splitter/combiner according to claim 1, wherein the second light transmission element is substantially parallel to the second optical surface.

9. The beam splitter/combiner according to claim 1, wherein a relative angle between the second light transmission element and the second optical surface may be regulated, and the relative angle is −1 degree to 1 degree.

10. The beam splitter/combiner according to claim 9, wherein the relative angle is –0.5 degrees to 0.5 degrees.

11. The beam splitter/combiner according to claim 1 further comprising a third light transmission element, wherein a gas layer is located between the third light transmission element and the second light transmission element;

wherein a third color beam incident on the first light-transmitting substrate passes through the first light transmission element, the second light transmission element, and the gas layer, is reflected by the third light transmission element, passes through the gas layer, the second light transmission element, and the first light transmission element sequentially, and leaves the first light-transmitting substrate, wherein paths of the first color beam, the second color beam, and the third color beam incident on or leaving the first light-transmitting substrate coincide.

12. The beam splitter/combiner according to claim 11, wherein the first color beam, the second color beam, and the third color beam are substantially parallel to each other, and the second color beam is located between the first color beam and the third color beam.

13. The beam splitter/combiner according to claim 11, wherein a material of the first light transmission element is different from a material of the third light transmission element.

14. The beam splitter/combiner according to claim 11, wherein a thickness of the first light transmission element is different from a thickness of the third light transmission element.

15. The beam splitter/combiner according to claim 11, wherein the third light transmission element is a mirror.

16. The beam splitter/combiner according to claim 11, wherein the second optical surface is substantially parallel to the third light transmission element.

17. The beam splitter/combiner according to claim 11, wherein a relative angle between the third light transmission element and the second optical surface may be regulated, and the relative angle is −1 degree to 1 degree.

18. The beam splitter/combiner according to claim 17, wherein the relative angle is –0.5 degrees to 0.5 degrees.

19. The beam splitter/combiner according to claim 11, wherein when a distance between the first color beam and the third color beam is d2, and a thickness of the gas layer is tg2, $$tg2 = \frac{d2 - d1}{2 \times \sin\theta}.$$

20. The beam splitter/combiner according to claim 11 further comprising a second light-transmitting substrate, the second light-transmitting substrate located between the second light transmission element and the third light transmission element, and the third light transmission element located on the second light-transmitting substrate.

21. The beam splitter/combiner according to claim 20, wherein when a distance between the first color beam and the third color beam is d2, refractive index of the second light-transmitting substrate is n2, and a thickness of the second light-transmitting substrate is t3, $$t3 = (d2 - d1) \times \frac{\sqrt{n2^2 - \sin^2\theta}}{\sin 2\theta}.$$

22. The beam splitter/combiner according to claim 1, wherein there is an angle between the first color beam and a normal line of the first optical surface of the first light-transmitting substrate, and the angle falls substantially in a range of 30 degrees to 60 degrees.

23. The beam splitter/combiner according to claim 22, wherein the angle is substantially 45 degrees.

24. A projection apparatus comprising a light source module, a beam splitter/combiner, a light valve, and a projection lens, wherein:

the light source module is configured to generate a first color beam and a second color beam;

the beam splitter/combiner is disposed on a transmission path of the first color beam and the second color beam, the beam splitter/combiner is configured to form an illumination beam from the first color beam and the second color beam, and the beam splitter/combiner comprises a first light-transmitting substrate, a first light transmission element, and a second light transmission element, wherein:

the first light-transmitting substrate has a first optical surface facing incident light and a second optical surface opposite to the first optical surface;

the first light transmission element is disposed on the first optical surface;

the second light transmission element is disposed on the second optical surface;

wherein the first color beam incident on the first light transmission element is reflected by the first light transmission element and leaves the first light transmission element, and the second color beam incident on the first light transmission element passes through the first light transmission element and the first light-transmitting substrate, is reflected by the second light transmission element, then passes through the first light-transmitting substrate and the first light transmission element, and leaves the first light transmission element, when a distance between the first color beam and the second color beam is d1, refractive index of the first light-transmitting substrate is n1, and an angle between the first color beam and a normal line of the first optical surface is θ, then a thickness of the and first light-transmitting substrate is t, $$t = \frac{\sqrt{n1^2 - \sin^2\theta}}{\sin 2\theta} \times d1,$$

and wherein paths of the first color beam and the second color beam incident on or leaving the first light-transmitting substrate coincide;

the light valve is disposed on a transmission path of the illumination beam, and the light valve is configured to convert the illumination beam into an image beam; and the projection lens is disposed on a transmission path of the image beam for projecting the image beam outside the projection apparatus.

25. The projection apparatus according to claim 24 further comprising a third light transmission element, and a gas layer located between the third light transmission element and the second light transmission element;

wherein the light source module is further configured to generate a third color beam, the first color beam, the second color beam, and the third color beam form the illumination beam, the third color beam incident on the first light-transmitting substrate passes through the first light transmission element, the second light transmission element, and the gas layer, is reflected by the third light transmission element, passes through the gas layer, the second light transmission element, and the first light transmission element sequentially, and leaves the first light-transmitting substrate, wherein paths of the first color beam, the second color beam, and the third color beam incident on or leaving the first light-transmitting substrate coincide.

26. A beam splitter/combiner comprising a first light-transmitting substrate, a first light transmission element, and a second light transmission element, wherein the first light-transmitting substrate has a first optical surface facing incident light and a second optical surface opposite to the first optical surface;

the first light transmission element is disposed on the first optical surface; and the second light transmission element is disposed on the second optical surface, wherein a gas layer is located between the second light transmission element and the first light-transmitting substrate;

wherein a first color beam incident on the first light transmission element is reflected by the first light transmission element and leaves the first light transmission element, and a second color beam incident on the first light transmission element passes through the first light transmission element and the first light-transmitting substrate, is reflected by the second light transmission element, then passes through the first light-transmitting substrate and the first light transmission element, and leaves the first light transmission element, and wherein paths of the first color beam and the second color beam incident on or leaving the first light-transmitting substrate coincide.

27. A beam splitter/combiner comprising a first light-transmitting substrate, a first light transmission element, and a second light transmission element, wherein the first light-transmitting substrate has a first optical surface facing incident light and a second optical surface opposite to the first optical surface;

the first light transmission element is disposed on the first optical surface; and the second light transmission element is disposed on the second optical surface;

wherein a first color beam incident on the first light transmission element is reflected by the first light transmission element and leaves th first light transmission element, and a second color beam incident on the first light transmission element passes through the first light transmission element and the first light-transmitting substrate, is reflected by the second light transmission element, then passes through the first light-transmitting substrate and the first light transmission element, and leaves the first light transmission element, wherein paths of the first color beam and the second color beam incident on or leaving the first light-transmitting substrate coincide, and wherein a relative angle between the second light transmission element and the second optical surface may be regulated, and the relative angle is-1 degree to 1 degree.

28. A beam splitter/combiner comprising a first light-transmitting substrate, a first light transmission element, a second light transmission element, and a third light transmission element, wherein the first light-transmitting substrate has a first optical surface facing incident light and a second optical surface opposite to the first optical surface;

the first light transmission element is disposed on the first optical surface; and the second light transmission element is disposed on the second optical surface;

wherein a first color beam incident on the first light transmission element is reflected by the first light transmission element and leaves the first light transmission element, and a second color beam incident on the first light transmission element passes through the first light transmission element and the first light-transmitting substrate, is reflected by the second light transmission element, then passes through the first light-transmitting substrate and the first light transmission element, and leaves the first light transmission element, wherein a gas layer is located between the third light transmission element and the second light transmission element;

wherein a third color beam incident on the first light-transmitting substrate passes through the first light transmission element, the second light transmission element, and the gas layer, is reflected by the third light transmission element, passes through the gas layer, the second light transmission element, and the first light transmission element sequentially, and leaves the first light-transmitting substrate, and wherein paths of the first color beam, the second color beam, and the third color beam incident on or leaving the first light-transmitting substrate coincide.

29. A projection apparatus comprising a light source module, a beam splitter/combiner, a light valve, and a projection lens, wherein:

the light source module is configured to generate a first color beam and a second color beam, wherein the light source module has at least two first color light units and at least one second color unit, a number of the at least two first color units is greater than a number of the at least one second color light unit, the at least two first color units are combined to emit the first color beam, and the at least one second color unit is combined to emit the second color beam;

the beam splitter/combiner is disposed on a transmission path of the first color beam and the second color beam, the beam splitter/combiner is configured to form an illumination beam from the first color beam and the second color beam, and the beam splitter/combiner comprises a first light-transmitting substrate, a first light transmission element, and a second light transmission element, wherein:

the first light-transmitting substrate has a first optical surface facing incident light and a second optical surface opposite to the first optical surface;

the first light transmission element is disposed on the first optical surface;

the second light transmission element is disposed on the second optical surface;

wherein the first color beam incident on the first light transmission element is reflected by the first light transmission element and leaves the first light transmission element, and the second color beam incident on the first light transmission element passes through the first light transmission element and the first light-transmitting substrate, is reflected by the second light transmission element, then passes through the first light-transmitting substrate and the first light transmission element, and leaves the first light transmission element, wherein paths of the first color beam and the second color beam incident on or leaving the first light-transmitting substrate coincide, wherein when incident positions of the first color beam and the second color beam on a surface of the first light transmission element are different, emission positions of the first color beam and the second color beam leaving the surface of the first light transmission element are coincide, or when the incident positions of the first color beam and the second color beam incident on the surface of the first light transmission element are coincide, the emission positions of the first color beam and the second color beam leaving the surface of the first light transmission element are different;

the light valve is disposed on a transmission path of the illumination beam, and the light valve is configured to convert the illumination beam into an image beam; and the projection lens is disposed on a transmission path of the image beam for projecting the image beam outside the projection apparatus.

* * * * *